(12) United States Patent
Matsubara et al.

(10) Patent No.: US 11,204,012 B2
(45) Date of Patent: Dec. 21, 2021

(54) CYLINDER HEAD STRUCTURE OF INTERNAL COMBUSTION ENGINE

(71) Applicant: TOYOTA JIDOSHA KABUSHIKI KAISHA, Aichi-ken (JP)

(72) Inventors: Naoyoshi Matsubara, Mishima (JP); Yoshihiro Kominami, Gotemba (JP); Ippei Funato, Numazu (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 17/084,643

(22) Filed: Oct. 30, 2020

(65) Prior Publication Data
US 2021/0180556 A1    Jun. 17, 2021

(30) Foreign Application Priority Data

Dec. 11, 2019   (JP) ............................. JP2019-223978

(51) Int. Cl.
*F02P 13/00*    (2006.01)
*H01T 1/22*     (2006.01)
*H01T 13/32*    (2006.01)
*H01T 14/00*    (2006.01)

(52) U.S. Cl.
CPC ................ *F02P 13/00* (2013.01); *H01T 1/22* (2013.01); *H01T 13/32* (2013.01); *H01T 14/00* (2013.01)

(58) Field of Classification Search
CPC .......... F02P 13/00; F02P 15/12; H01T 13/32; H01T 1/20; H01T 1/22; H01T 13/52; H01T 14/00
See application file for complete search history.

(56) References Cited

U.S. PATENT DOCUMENTS

| 6,378,490 B1* | 4/2002 | Ottowitz | ............... F02F 1/4214 123/305 |
|---|---|---|---|
| 2010/0083942 A1 | 4/2010 | Lykowski et al. | |
| 2012/0279468 A1 | 11/2012 | Burrows et al. | |
| 2016/0072259 A1 | 3/2016 | Kinoshita et al. | |

FOREIGN PATENT DOCUMENTS

| CN | 102224650 A | 10/2011 | |
| CN | 103444024 A | 12/2013 | |
| JP | 201658196 A | 4/2016 | |
| JP | 2019125440 A | * 7/2019 | .............. F02P 13/00 |
| JP | 2019125440 A | 7/2019 | |

* cited by examiner

*Primary Examiner* — Jacob M Amick
(74) *Attorney, Agent, or Firm* — Hauptman Ham, LLP (57) ABSTRACT

A spark plug includes a ground electrode, an insulator, and a center electrode. In a case where a first position of a surface of the ground electrode exposed to a side of an inner wall surface of a cylinder head is a most downstream position in an air flow direction between the center electrode and the ground electrode, and a second position of the inner wall surface of the cylinder head is a position closest to the center electrode on a downstream side of the center electrode in an air flow direction, the spark plug is installed at a position where the first position and the second position are on a same air flow line, or at a position where the first position is recessed to a side where the first position recedes from the inner wall surface than the second position.

10 Claims, 9 Drawing Sheets

CYLINDER HEAD STRUCTURE OF INTERNAL COMBUSTION ENGINE

CROSS-REFERENCE TO RELATED APPLICATION

The present application claims priority under 35 U.S.C. § 119 to Japanese Patent Application No. 2019-223978, filed Dec. 11, 2019. The contents of this application are incorporated herein by reference in their entirety.

BACKGROUND

Field

The present disclosure relates to a cylinder head structure of an internal combustion engine.

Background

Japanese Patent Application Laid-Open No. 2016-58196 discloses a technique related to a spark plug of an internal combustion engine. The spark plug of this technology is provided with a ground electrode having a cylindrical shape, an insulator having a cylindrical shape and protruding from the ground electrode to a tip side, and a center electrode protruding further to the tip side from the insulator. When a high frequency voltage is applied to the center electrode, a discharge occurs between the ground electrode and the center electrode. In this technology, the discharge is pulled away from the insulator by devising the shape of the ground electrode to ensure stable ignitability.

SUMMARY

Air flow is generated in a combustion chamber of an internal combustion engine. When the discharge path is stretched by the air flow, a wide range of the air-fuel mixture is heated and has a favorable effect on ignitability. However, on the other hand, the discharge path may be short-circuited halfway due to fluctuation of the discharge path or the like. Therefore, the above conventional technique, in terms of reducing the stability and combustion variation of ignition, there remains room for improvement.

The present disclosure has been made in view of the above-mentioned problems, and an object thereof is to provide a cylinder head structure of an internal combustion engine capable of improving ignition stability and reducing combustion variation.

To solve the above problems, the first disclosure is applied to a cylinder head structure of an internal combustion engine in which a spark plug is installed to a through hole penetrating to an inner wall surface of a cylinder head. The spark plug includes a ground electrode having a cylindrical shape, an insulator being held inside the ground electrode and protruding to a tip side than a tip of the ground electrode, and a center electrode being held inside the insulator and protruding to a tip side than a tip of the insulator. In a case where a first position of a surface of the ground electrode exposed to a side of the inner wall surface of the cylinder head is a most downstream position in an air flow direction between the center electrode and the ground electrode, and a second position of the inner wall surface of the cylinder head is a position closest to the center electrode on a downstream side of the center electrode in an air flow direction, the spark plug is installed at a position where the first position and the second position are on a same air flow line, or at a position where the first position is recessed to a side where the first position recedes from the inner wall surface than the second position.

The second disclosure has the following further features in the first disclosure.

The ground electrode includes a side surface portion having a cylindrical shape, and a tip surface covering the tip of the side surface portion. The first position is located at an outer edge of the tip surface. The second position is located on an outer edge of the through hole in the inner wall surface of the cylinder head.

The third disclosure has the following further features in the first disclosure.

In a plane perpendicular to an axial direction of a crankshaft of the internal combustion engine through a plug central axis of the spark plug, the air flow direction is a direction from an intake side of the cylinder head toward an exhaust side along the inner wall surface.

The fourth disclosure has the following features in the first disclosure.

In a downstream side of the center electrode in the air flow direction, the cylinder head includes a stepped portion protruding from the inner wall surface of a periphery.

The fifth disclose has the following features in the fourth disclosure.

The stepped portion is configured so that an amount of protrusion from the inner wall surface of the periphery increases toward a downstream side of the air flow direction.

To solve the above problems, the sixth disclosure is applied to a cylinder head structure of an internal combustion engine in which a spark plug is installed to a through hole penetrating to an inner wall surface of a cylinder head. The spark plug includes a ground electrode having a cylindrical shape, an insulator being held inside the ground electrode and protruding to a tip side than a tip of the ground electrode, and a center electrode being held inside the insulator and protruding to a tip side than a tip of the insulator. In a downstream side of the center electrode in an air flow direction flowing between the center electrode and the ground electrode, the cylinder head includes a stepped portion protruding from the inner wall surface of a periphery.

The seventh disclose has the following features in the sixth disclosure.

The stepped portion is configured so that an amount of protrusion from the inner wall surface of the periphery increases toward a downstream side of the air flow direction.

The eighth disclose has the following features in the sixth disclosure.

In a plane perpendicular to an axial direction of a crankshaft of the internal combustion engine through a plug central axis of the spark plug, the air flow direction is a direction from an intake side of the cylinder head toward an exhaust side along the inner wall surface.

According to the cylinder head of the internal combustion engine according to the first disclosure, the discharge start point of the ground electrode side of the discharge path is moved by being flowed into the air flow flowing between the center electrode and the ground electrode, making it easier to move smoothly from the ground electrode to the inner wall surface of the cylinder head. As a result, the discharge start point interval of the discharge path is kept wide while heating a wide range of the air-fuel mixture by discharge, so that it is hard to short-circuit even when the discharge path fluctuates. This make it possible to suppress the combustion variation by increasing the ignition stability.

According to the cylinder head of the internal combustion engine according to the sixth disclosure, the movement range of a discharge start point can be limited to a range not exceeding the stepped portion by the configuration of the stepped portion. It is possible to limit the unconditional movement of the discharge start point to the side of the cylinder wall surface of the combustion chamber. This make it possible to prevent the discharge start point from moving to a range in which ignition of the air-fuel mixture is unlikely occur.

DETAILED DESCRIPTION

Hereinafter, an embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

First Embodiment

The first embodiment will be described with reference to FIGS.

Figure 1:
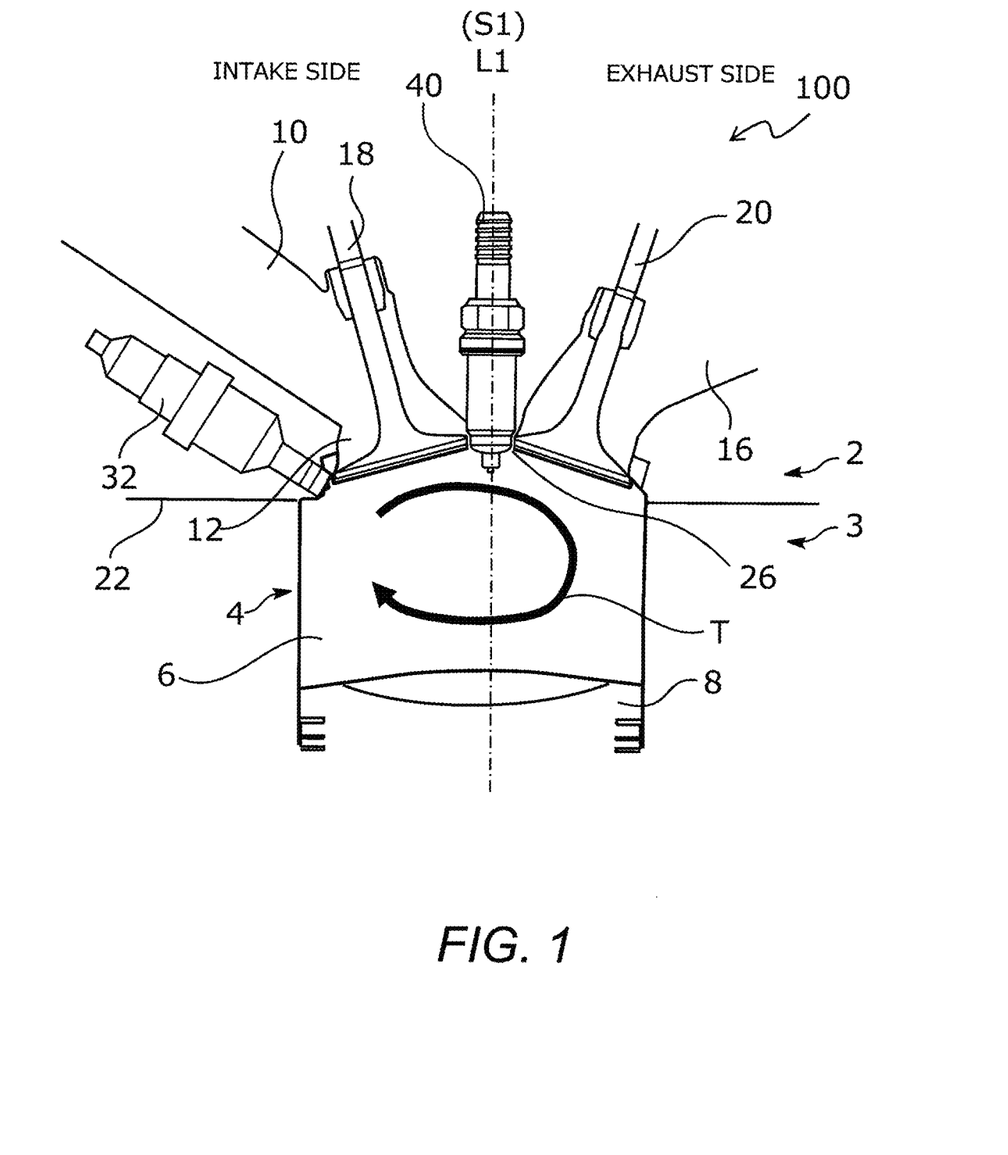
FIG. 1 is a diagram schematically showing a configuration of an internal combustion engine according to the first embodiment.

1. Configuration of First Embodiment 1-1. Cylinder Head Structure for Internal Combustion Engine FIG. 1 is a diagram schematically showing a configuration of an internal combustion engine according to the first embodiment. In FIG. 1, the elements constituting the internal combustion engine 100 are drawn projected on one plane perpendicular to an axial direction of a crankshaft. Although only one cylinder 4 is depicted in FIG. 1, the internal combustion engine 100 includes a plurality of cylinders 4. The internal combustion engine 100 includes a cylinder block 3 in which a cylinder 4 is formed, and a cylinder head 2 disposed on the cylinder block 3. A piston 8 which reciprocates in its axial direction is disposed in the cylinder 4. A mating surface 22 with the cylinder block 3 of the cylinder head 2, a combustion chamber 6 is formed by an inner wall surface 24 of a pent roof shape which is the upper space of the cylinder 4.

Figure 2:
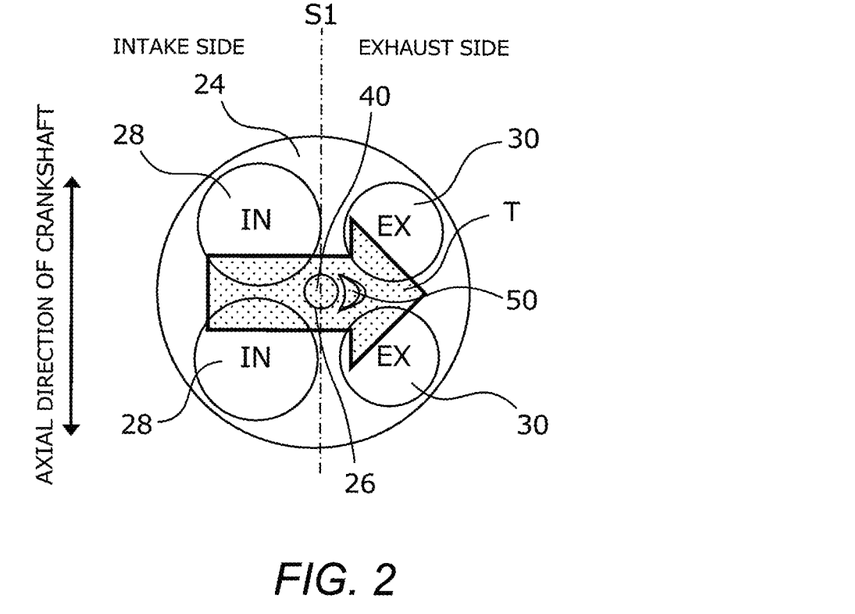
FIG. 2 is a view of the inner wall surface of the cylinder head from the side of the combustion chamber.

FIG. 2 is a view of the inner wall surface of the cylinder head from the side of the combustion chamber. Hereinafter, the cylinder head structure of the internal combustion engine will be described with reference to FIG. 2. The substantially central portion of the inner wall surface 24 of the combustion chamber 6, a through hole 26 penetrating to the side of the inner wall surface 24 is provided. A spark plug 40 is installed to the through hole 26. In the following description, the central axis of the spark plug 40 is referred to as "plug central axis L1". Further, a plane parallel to the axial direction of the crankshaft including the plug central axis L1 is referred to as a reference surface S1. The configuration of the spark plug 40 will be described in detail later.

In the inner wall surface 24, two inlets 28 leading to an intake port 10 is formed on one side of the reference surface S1. Further, in the inner wall surface 24, two outlets 30 leading to an exhaust port 16 is formed on the other side of the reference surface S1. An intake valve 18 is provided at each of the two inlets 28, and an exhaust valve 20 is provided at each of the two outlets 30. In the following description, the side where the inlet 28 is formed with respect to the reference surface S1 is referred to as an "intake side", the side where the outlet 30 is formed with respect to the reference surface S1 denotes an "exhaust side".

Further, a direct injection fuel injector 32 is disposed on the intake side of the inner wall surface 24. The internal combustion engine 100 according to the first embodiment is configured to be capable of performing stratified combustion by the cylindrical injection by the direct injection fuel injector 32. The intake port 10 extends substantially straight from its inlet toward the combustion chamber 6, a flow passage cross-sectional area is narrowed in a throat 12 which is a connection portion with the combustion chamber 6. Such a shape of the intake port 10 causes a tumble flow in the intake air sucked into the combustion chamber 6. The tumble flow here is an air flow in which air sucked from the inlet 28 into the combustion chamber 6 swirls in a direction from the side of the outlet 30 toward the crown surface of the piston 8. In FIGS. 1 and 2, the tumble flow is denoted as "T". A dent is formed in the piston 8 forming the bottom of the combustion chamber 6 to hold the tumble flow. Note that the structure for generating a tumble stream is not particularly limited, and various known structures may be applied.

1-2. Characteristic Structure of Spark Plug

Figure 3:
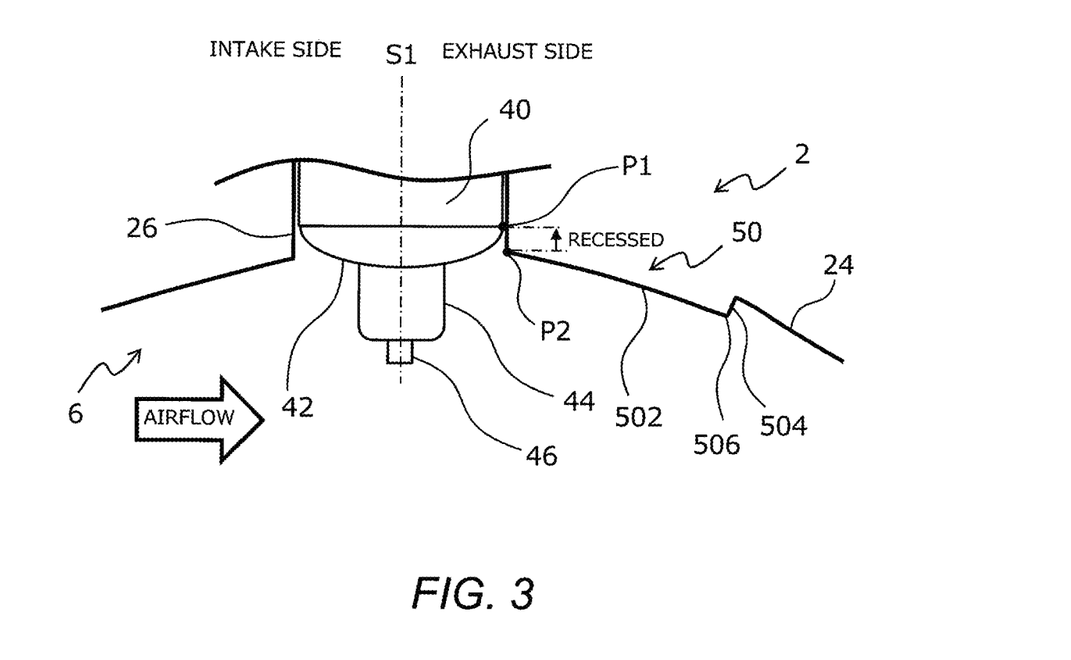
FIG. 3 is an enlarged view of a tip portion of an spark plug installed on a cylinder head in a cross-section including a plug central axis and perpendicular to an axial direction of a crankshaft.

FIG. 3 is an enlarged view of a tip portion of a spark plug installed on a cylinder head in a cross-section including a plug central axis and perpendicular to an axial direction of a crankshaft. As shown in FIG. 3, the spark plug 40 is fixed to the through hole 26 so that the tip portion is exposed to the side of the combustion chamber 6. A ground electrode 42, an insulator 44, and a center electrode 46, are formed at a position on the plug central axis of the tip of the spark plug 40. The ground electrode 42 is an electrode having a cylindrical shape, a tip surface covering the tip of a cylindrical side surface portion has a dome shape. The ground electrode 42 and the cylinder head 2 are both metallic, by the screw portion of the spark plug 40 is in contact with the through hole 26, the ground electrode 42 and the cylinder head 2 has the same potential level.

The insulator 44 is an insulator having a cylindrical shape and protruding from the tip surface of the ground electrode 42 to the tip side of the plug central axis direction while being held inside the ground electrode 42. Cylinder diameter of the insulator 44 is smaller than the cylindrical diameter of the ground electrode 42. The center electrode 46 is an electrode having a cylindrical shape which is further protruded from the tip surface of the insulator 44 to the tip side of the plug central axis direction while being held inside the insulator 44. In one example the center electrode 46 has a structure protruding 2 mm or more from the tip surface of the ground electrode 42. The spark plug 40 is configured to cause a discharge between the ground electrode 42 and the center electrode 46 by applying a high frequency voltage to the center electrode 46. At the time of discharge, a current value of 150 mA or more is maintained for a predetermined time.

1-3. Characteristic Structure of Inner Wall Surface of Cylinder Head

As shown in FIGS. 2 and 3, a stepped portion 50 is formed on the exhaust side of the inner wall surface 24 of the cylinder head 2. The stepped portion 50 has a shape protruding convexly from the inner wall surface 24 of the periphery constituting the pent roof shape. Specifically, the stepped portion 50 includes a raised surface 502 and a stepped surface 504. The raised surface 502 is configured so that on the exhaust side of the inner wall surface 24, the amount of protrusion from the surrounding inner wall surface 24 increases as it moves in the direction of the air flow of the tumble flow T flowing between the center electrode 46 and the ground electrode 42 (i.e. as it moves away from the reference surface S1 to the exhaust side). The stepped surface 504 is configured to form a step from the outer edge of the raised surface 502 to the surrounding inner wall surface 24. The raised surface 502, for example, in a cross section perpendicular to the axial direction of the crankshaft includes a plug central axis L1, and a surface protruding on the arc from the tangential direction of the inner wall surface 24, it can be configured as a surface protruding linearly from the inner wall surface 24. In addition, the stepped surface 504 may be configured, for example, as a surface having an acute angle with respect to the raised surface 502. The width of the stepped portion 50 can be configured to be gradually reduced as it travels in the air flow direction from the width of the ground electrode 42 of the spark plug 40, for example. An edge portion 506 is formed on the raised surface 502 at a portion intersecting with the stepped surface 504. The size of the step in the edge portion 506 is formed to be, for example, between 1 mm and 2 mm.

1-4. Spark Plug Installation Structure

The spark plug 40 of the present embodiment is characterized by an installation structure to the cylinder head 2. As shown in FIG. 3, the position on the tip surface of the ground electrode 42 that is the most downstream in the air flow direction (that is, the outer edge of the tip surface of the ground electrode 42) is defined as the first position P1. Further, on the downstream side of the center electrode 46 in the air flow direction, the position of the inner wall surface 24 closest to the center electrode 46 (that is, the outer edge of the through hole 26) is defined as the second position P2. In this case, the spark plug 40 is installed in such a way that the first position P1 is disposed on the same air flow line as the second position P2, or the first position P1 is recessed on the side receding from the inner wall surface 24 than the second position P2.

2. Movement Operation of Discharge Start Point of Spark Plug

The internal combustion engine 100 of the present embodiment has a feature in a structure for moving a discharge start point of the spark plug 40 by utilizing an air flow generated in the combustion chamber 6. The movement form of the discharge start point is classified into the following three types according to the surface shape of the ground electrode.

Figure 4:
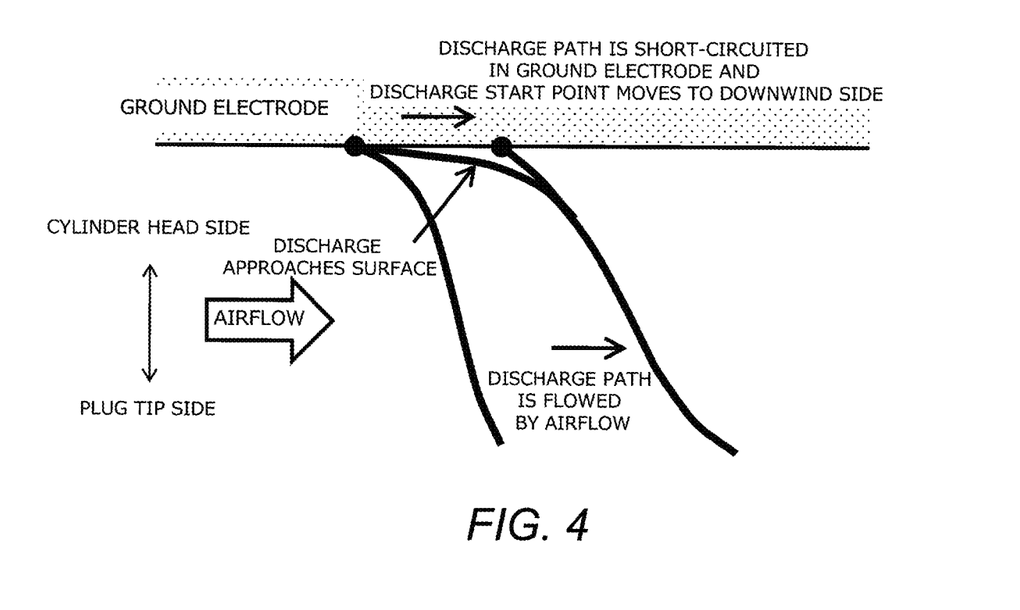
FIG. 4 is a diagram for explaining a movement operation of the discharge start point in a planar ground electrode.

FIG. 4 is a diagram for explaining a movement operation of the discharge start point in a planar ground electrode. As shown in FIG. 4, when the discharge path is flowed by the air flow, a portion thereof approaches the surface of the ground electrode. Then, when the discharge path is short-circuited in the downwind side of the ground electrode, the discharge start point at the ground electrode moves to the short-circuit position. By such operation is repeated, the discharge start point gradually moves the surface of the planar ground electrode in the downstream direction of the air flow.

Figure 5:
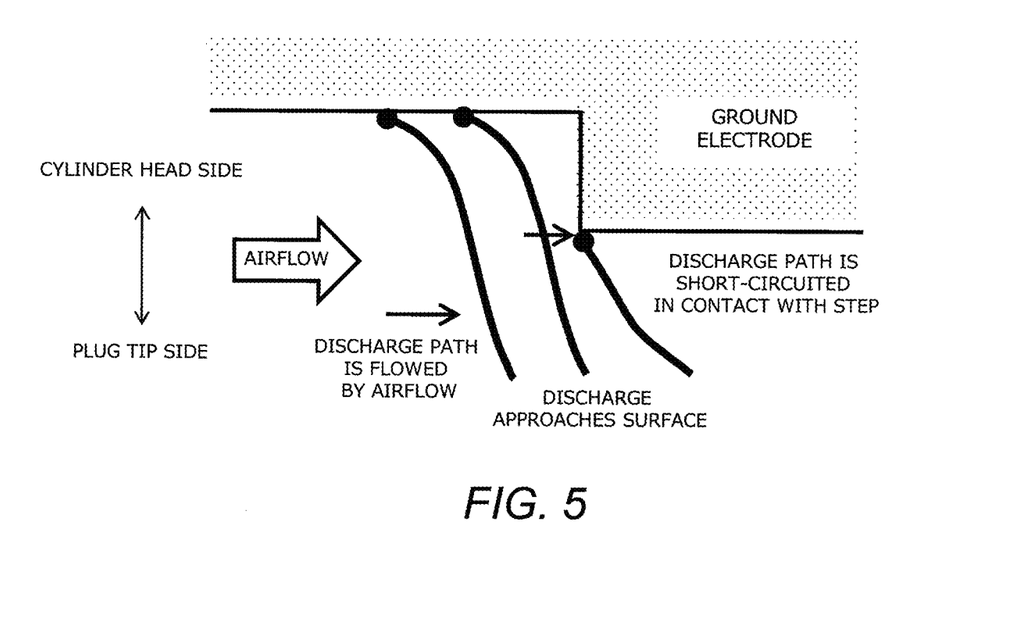
FIG. 5 is a diagram for explaining the movement operation of the discharge start point when there is a step rising toward the plug tip side of the plug central axis from the ground electrode in the downwind direction of the air flow.

FIG. 5 is a diagram for explaining the movement operation of the discharge start point when there is a step rising toward the plug tip side of the plug central axis from the ground electrode in the downwind direction of the air flow. As shown in FIG. 5, when the discharge path is flowed by the air flow, the middle of the path is short-circuited in contact with the step of the ground electrode. Then, the discharge start point moves to the upper side of the step of the ground electrode 42.

Figure 6:
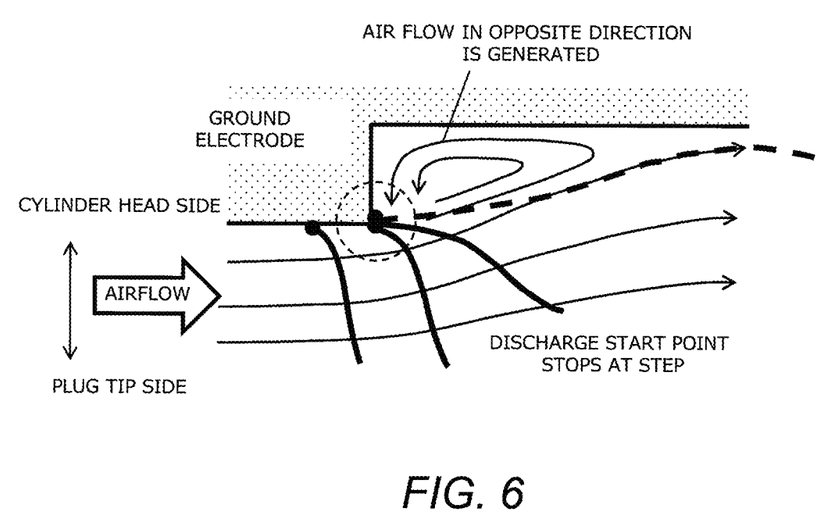
FIG. 6 is a view for explaining the movement operation of the discharge start point in the case where there is a step that lowers from the ground electrode toward the cylinder head side of the plug central axis in the downwind direction of the air flow.

FIG. 6 is a view for explaining the movement operation of the discharge start point in the case where there is a step that lowers from the ground electrode toward the cylinder head side of the plug central axis in the downwind direction of the air flow. As shown in FIG. 6, an air flow in the opposite direction to the air flow direction is generated in the stepped portion of the step to be lowered. As a result, the discharge start point flowed by the air flow may not move the stepped surface along the step to be lowered, the movement of the discharge start point stops at the step to be lowered.

Figure 7:
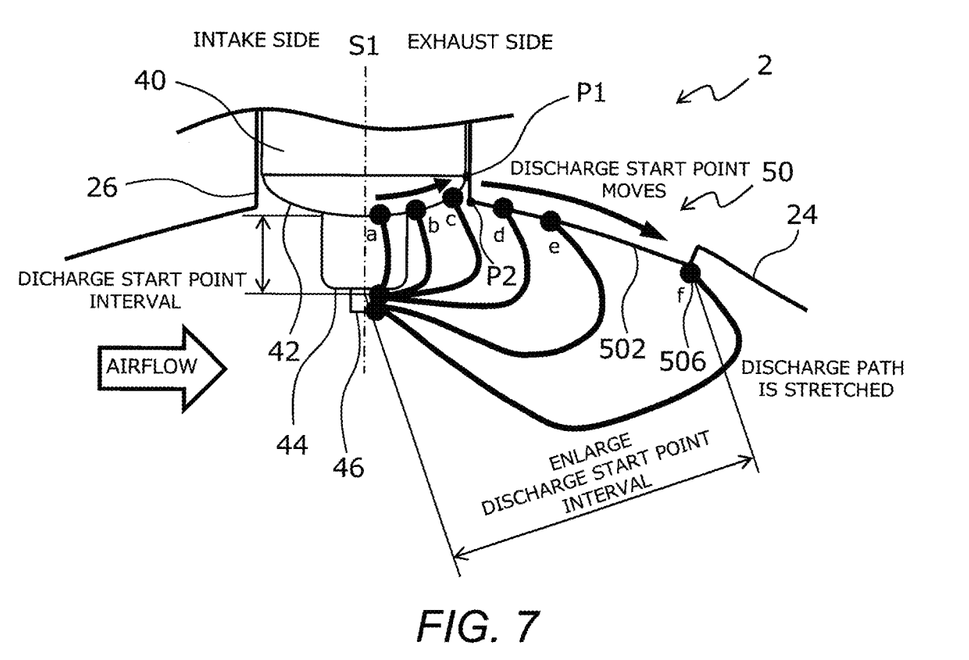
FIG. 7 is a diagram showing a state in which the discharge start point moves in a stepwise manner in a cross-section perpendicular to the axial direction of the crankshaft including the plug central axis.

According to the internal combustion engine 100 of the present embodiment, the discharge start point of the spark plug 40 is moved from the ground electrode 42 to the side of an inner wall surface 24 of the cylinder head 2 by combining the forms shown in FIGS. 4 to 6 above. FIG. 7 is a diagram showing a state in which the discharge start point moves in a stepwise manner in a cross-section perpendicular to the axial direction of the crankshaft including the plug central axis. As shown in FIG. 7, first, the discharge path is formed between the discharge start point "a" on the tip surface of the ground electrode 42 and the center electrode 46 so that the discharge start point distance is shortest.

Here, between the center electrode 46 and the ground electrode 42, air flow flowing toward the exhaust side from the intake side (tumble flow T) is generated. The discharge start point of the ground electrode 42 side moves from the discharge start point "a" to the discharge start point "b" and then to the discharge start point "c" in sequence due to the influence of the air flow.

As described above, at the most downstream position in the air flow direction, the spark plug 40 is installed in such a manner that the first position P1 of the tip surface of the ground electrode 42 is more recessed or coincident with the axial direction of the plug central axis L1 than the second position P2 on the outer edge of the through hole 26 of the cylinder head 2. That is, the movement path from the first position P1 of the tip surface of the ground electrode 42 to the second position P2 of the through hole 26 of the cylinder head 2 is a raised step as shown in FIG. 5 or a path coincident with the plug central axis direction. Therefore, the discharge start point of the ground electrode 42 side moves from the discharge start point "c" to the discharge start point "d" of the cylinder head 2 side by the influence of the air flow. Then, the discharge start point moved to the cylinder head 2 side moves from the discharge start point "d" to the discharge start point "e" and then to the discharge start point "f" in sequence on a raised surface 502 of the stepped portion 50 by the influence of the air flow.

End of the air flow direction downstream side of the raised surface 502 of the stepped portion 50 has a step that falls as shown in FIG. 6. As a result, the discharge start point "f" reaching the end of the air flow direction downstream side of the raised surface 502 may not move further in the air flow direction and stops at an edge portion 506 of the stepped portion 50.

According to such a movement operation of the discharge start point, the following operation and effect can be obtained.

Since it is possible to enlarge the discharge start point interval, it is possible to suppress the short circuit of the discharge. Thus, since it is possible to heat a wide range of air-fuel mixture, it is possible to achieve the effects of improving the ignitability, reducing the combustion variation, expanding the EGR limit, expanding the lean limit, suppressing knocking, etc.

The spark plug 40 is installed in such that the first position P1 of the tip surface of the ground electrode 42 is more recessed or coincident with the axial direction of the plug central axis L1 than the second position P2 of the through hole 26. This allows the discharge start point to be stably moved toward the cylinder head 2.

The movement of the discharge start point is limited by the edge portion 506 of the stepped portion 50. This make it possible to prevent the discharge start point from moving toward the region of the air-fuel mixture that is difficult to ignite on the cylinder wall side of the combustion chamber 6. As a result, the easily ignitable air-fuel mixture near the center of the combustion chamber 6 may be efficiently heated. This can stabilize the ignition. It also prevents the discharge start point from moving to components such as the exhaust valve 20, and thus prevents the occurrence of components failure.

3. Modified Examples

The internal combustion engine 100 according to the present embodiment may be applied with a cylinder head structure modified as described below.

Figure 8:
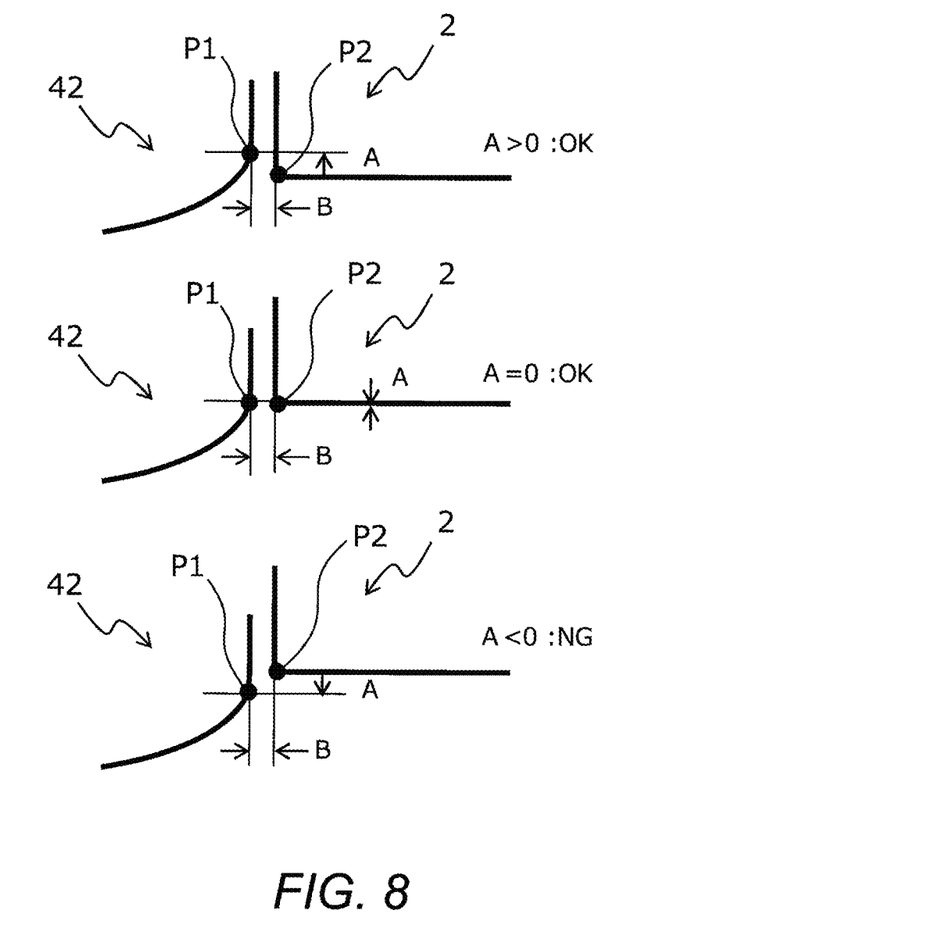
FIG. 8 is a diagram for explaining a positional relationship between the first position P1 of the tip surface of the ground electrode and the second position P2 of the through hole.
Figure 9:
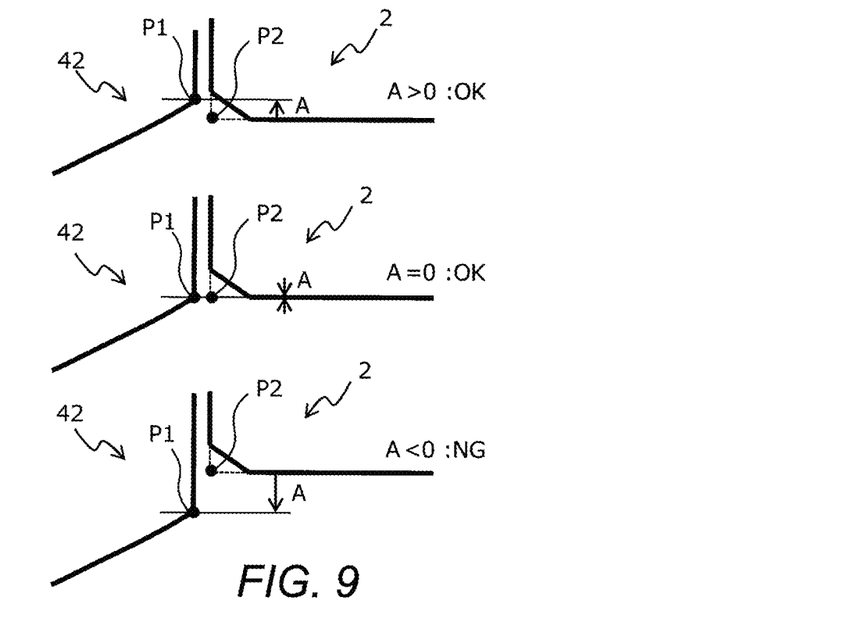
FIG. 9 is a diagram for explaining a modified example of the shape of the tip surface of the ground surface and the shape of the end surface of the through hole.
Figure 10:
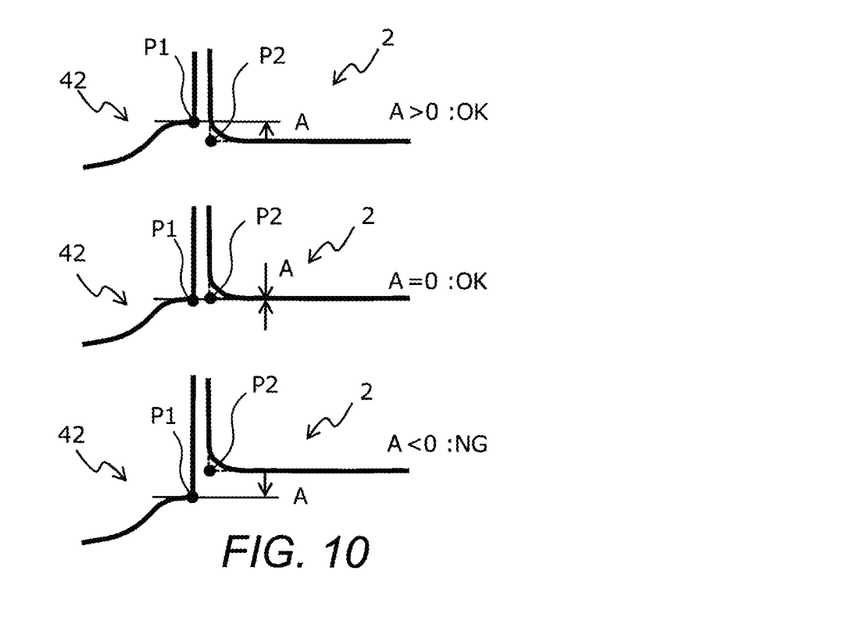
FIG. 10 is a diagram for explaining a modified example of the shape of the tip surface of the ground surface and the shape of the end surface of the through hole.
Figure 11:
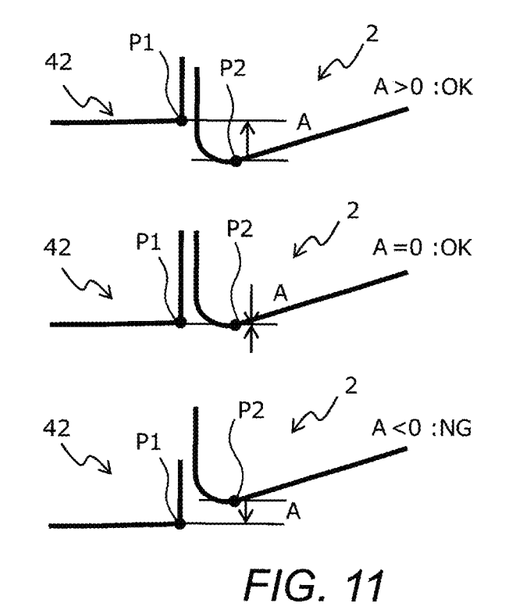
FIG. 11 is a diagram for explaining a modified example of the shape of the tip surface of the ground surface and the shape of the end surface of the through hole.
Figure 12:
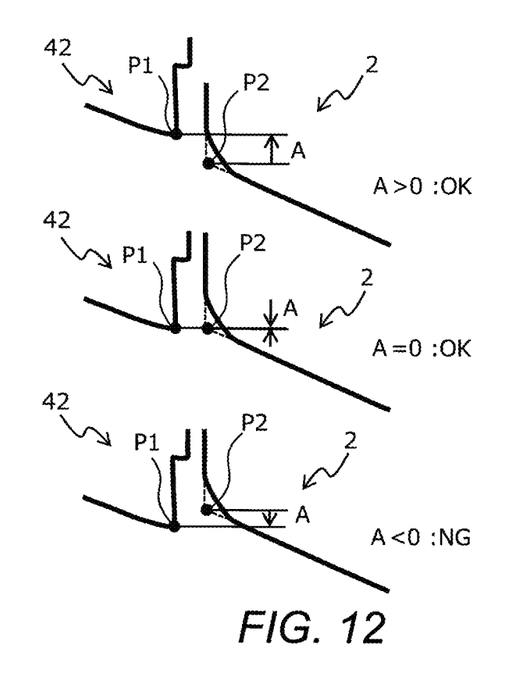
FIG. 12 is a diagram for explaining a modified example of the shape of the tip surface of the ground surface and the shape of the end surface of the through hole.
Figure 13:
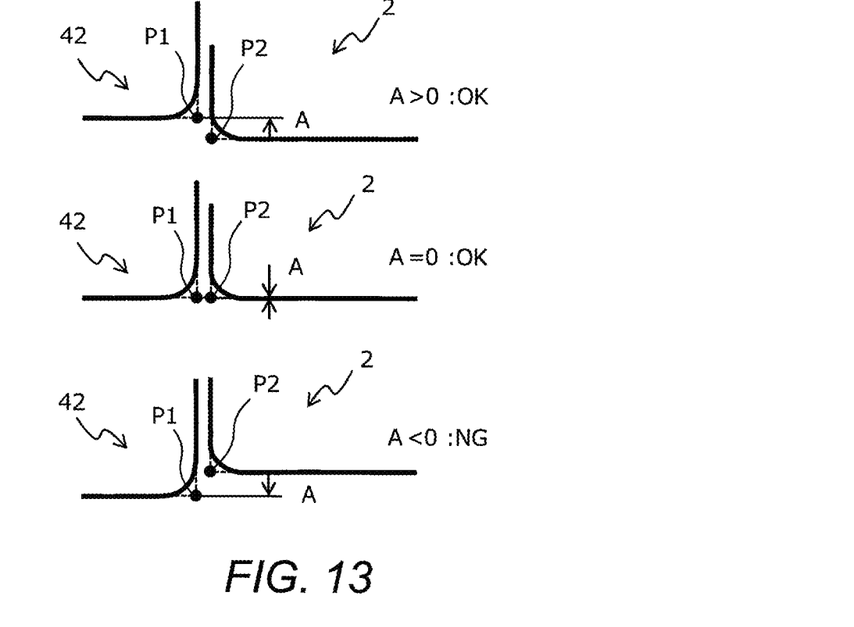
FIG. 13 is a diagram for explaining a modified example of the shape of the tip surface of the ground surface and the shape of the end surface of the through hole.
Figure 14:
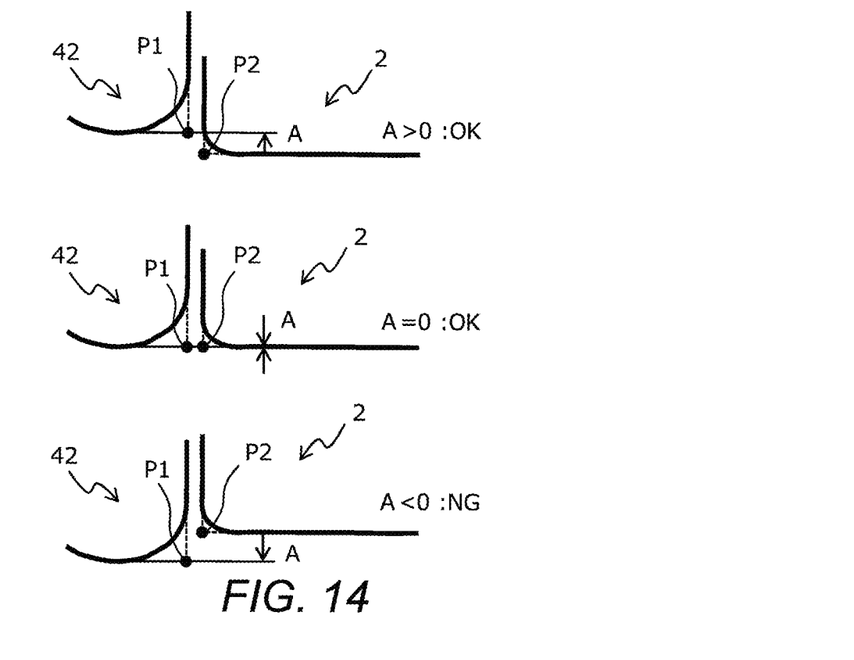
FIG. 14 is a diagram for explaining a modified example of the shape of the tip surface of the ground surface and the shape of the end surface of the through hole.

FIG. 8 is a diagram for explaining a positional relationship between the first position P1 of the tip surface of the ground electrode and the second position P2 of the through hole. As shown in FIG. 8, when the distance in the direction of the plug central axis L1 between the first position P1 of the tip surface of the ground electrode 42 and the second position P2 of the through hole 26 (i.e. the recessed amount of the first position P1) is A mm, and the distance in the direction of the plug radial direction is B mm, there is no limitation on the other dimensions as long as A≥0 mm. However, the distance B should be set to, for example, B≤1 mm, and it is best to set A=B=0, but it is set to, for example, A=0 mm, B=0.95 mm by design. Also, for example, the settings of A and B may be adopted such that the relation A>−0.5B is satisfied.

There is no limitation on the shape of the tip surface of the ground electrode 42 and the shape of the through hole. FIGS. 9 to 14 are a diagram for explaining a modified examples of the shape of the tip surface of the ground surface and the shape of the end surface of the through hole. As shown in these drawings, when the ground electrode 42 and the through hole 26 has a special shape, for example, may be defined a second position P2 of the first position P1 and the through hole 26 of the ground electrode 42 as shown in these drawings. Specifically, in the examples of FIGS. 9, 10, 12, 13 and 14, when the end of the through hole 26 has a chamfer or a round chamfer, the position of the end without the chamfer or the round chamfer is defined as the second position P2. Further, in the example of FIG. 11, when the end portion of the through hole 26 has a round chamfer and has a sharp angle, the end portion of the through hole 26 protruding most in the tip direction of the plug central axis L1 is defined as the second position P2. Further, in the example of FIGS. 13 and 14, when the outer edge of the ground electrode 42 has a chamfer or a round chamfer, the position of the end portion without the chamfer or the round chamfer is defined as the first position P1.

Figure 15:
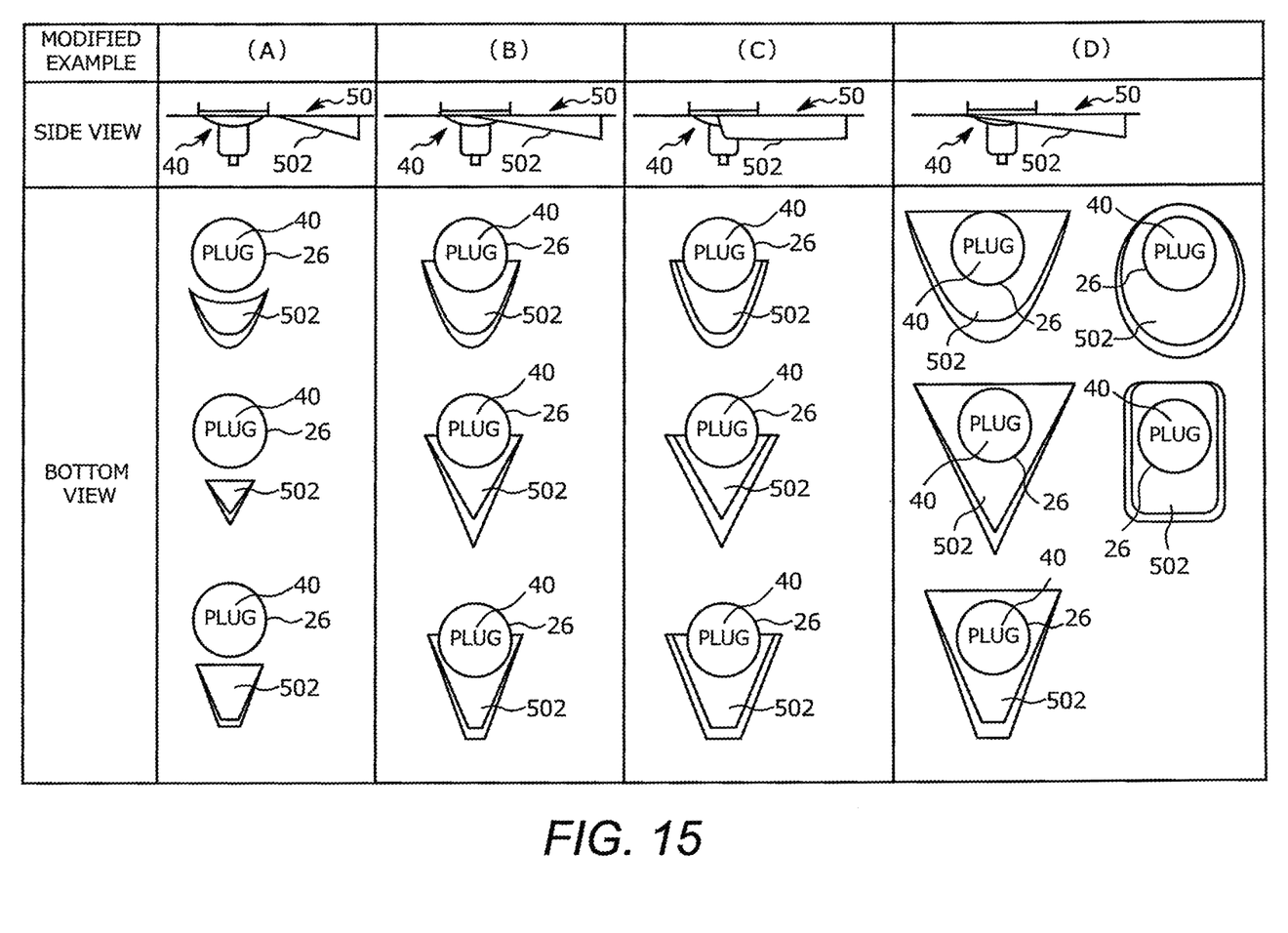
FIG. 15 is a diagram showing a modified example of the structure of the stepped portion.

Various deformed structures can be applied to the shape of the stepped portion 50. FIG. 15 is a diagram showing a modified example of the structure of the stepped portion. In the modified example (A) in FIG. 15, the raised surface 502 is formed on the air flow downstream side than the through hole 26 in which the ground electrode 42 is exposed. In the modified examples (B) and (C) in FIG. 15, the raised surface 502 is formed from a position covering the half circumference of the through hole 26 toward the downstream side of the air flow. In the modified example (D) in FIG. 15, the raised surface 502 is formed from a position covering the entire circumference of the through hole 26 toward the air flow downstream side. In addition, the modified examples (A), (B) and (D) in FIG. 15 are configured such that the raised surface 502 gradually protrudes linearly toward the downstream side of the air flow. The modified example in FIG. 15, the raised surface 502 is configured as a plane protruding parallel from the inner wall surface 24 of the periphery. Further, the modified example (A), (B), (C) and (D) in FIG. 15, various shapes such as arcuate, triangular, square, etc., may be adopt as the raised surface 502.

Basically, the stepped portion 50 is not an essential configuration. Even without the stepped portion 50, the cylinder head structure of the internal combustion engine 100 has the effect of facilitating the smooth movement of at least the discharge start point of the discharge path from the ground electrode 42 to the inner wall surface 24 of the cylinder head 2, as long as the spark plug 40 is installed in such a way that the first position P1 is more recessed or coincident with the axial direction of the plug central axis L1 than the second position P2. However, the discharge start point of the discharge path can move from the ground electrode 42 to the inner wall surface 24 of the cylinder head 2, regardless of the position of the first position P1 and the second position P2. Therefore, if the spark plug 40 is not installed in such a way that the first position P1 is more recessed or coincide with the axial direction of the plug central axis L1 than the second position P2, the cylinder head structure of the internal combustion engine 100 should have at least a stepped section 50 as an essential configuration. This has the effect of preventing the discharge start point from moving to the inner wall surface 24 of the cylinder head 2, even if the discharge start point moves to the inner wall surface 24 of the cylinder head 2, the configuration of the stepped portion 50 prevents the discharge start point from moving to a range where ignition of the air-fuel mixture is unlikely to occur.

What is claimed is:

1. A cylinder head structure of an internal combustion engine in which a spark plug is installed to a through hole penetrating to an inner wall surface of a cylinder head, the spark plug including:
    a ground electrode having a cylindrical shape;
    an insulator being held inside the ground electrode and protruding to a tip side than a tip of the ground electrode; and
    a center electrode being held inside the insulator and protruding to a tip side than a tip of the insulator,
    wherein
    a first position of a surface of the ground electrode exposed to a side of the inner wall surface of the cylinder head is a most downstream position in an air flow direction between the center electrode and the ground electrode,
    a second position of the inner wall surface of the cylinder head is a position closest to the center electrode on a downstream side of the center electrode in an air flow direction, and
    the spark plug is installed at a position where, in a plane perpendicular to an axial direction of a crankshaft of the internal combustion engine through a plug central axis of the spark plug,
        the first position and the second position are on a same air flow line, or
        along the plug central axis of the spark plug, the first position recedes from the inner wall surface more than the second position.

2. The cylinder head structure of the internal combustion engine according to claim 1,
    wherein the ground electrode includes a side surface portion having a cylindrical shape, and a tip surface covering the tip of the side surface portion,
    wherein the first position is located at an outer edge of the tip surface, and
    wherein the second position is located on an outer edge of the through hole in the inner wall surface of the cylinder head.

3. The cylinder head structure of the internal combustion engine according to claim 1,
    wherein, in the plane perpendicular to the axial direction of the crankshaft of the internal combustion engine through the plug central axis of the spark plug, the air flow direction is a direction from an intake side of the cylinder head toward an exhaust side along the inner wall surface.

4. A cylinder head structure of an internal combustion engine in which a spark plug is installed to a through hole penetrating to an inner wall surface of a cylinder head, the spark plug including:
    a ground electrode having a cylindrical shape;
    an insulator being held inside the ground electrode and protruding to a tip side than a tip of the ground electrode; and
    a center electrode being held inside the insulator and protruding to a tip side than a tip of the insulator,
    wherein in a case where a first position of a surface of the ground electrode exposed to a side of the inner wall surface of the cylinder head is a most downstream position in an air flow direction between the center electrode and the ground electrode, and a second position of the inner wall surface of the cylinder head is a position closest to the center electrode on a downstream side of the center electrode in an air flow direction, the spark plug is installed at a position where the first position and the second position are on a same air flow line, or at a position where the first position is recessed to a side where the first position recedes from the inner wall surface than the second position, and
    wherein in a downstream side of the center electrode in the air flow direction, the cylinder head includes a stepped portion protruding from the inner wall surface of a periphery.

5. The cylinder head structure of an internal combustion engine according to claim 4,
    wherein the stepped portion is configured so that an amount of protrusion from the inner wall surface of the periphery increases toward a downstream side of the air flow direction.

6. A cylinder head structure of an internal combustion engine in which a spark plug is installed to a through hole penetrating to an inner wall surface of a cylinder head, the spark plug including:
    a ground electrode having a cylindrical shape;
    an insulator being held inside the ground electrode and protruding to a tip side than a tip of the ground electrode; and
    a center electrode being held inside the insulator and protruding to a tip side than a tip of the insulator,
    wherein in a downstream side of the center electrode in an air flow direction flowing between the center electrode and the ground electrode, the cylinder head includes a stepped portion protruding from the inner wall surface of a periphery.

7. The cylinder head structure of an internal combustion engine according to claim 6,
    wherein the stepped portion is configured so that an amount of protrusion from the inner wall surface of the periphery increases toward a downstream side of the air flow direction.

8. The cylinder head structure of an internal combustion engine according to claim 6,
wherein in a plane perpendicular to an axial direction of a crankshaft of the internal combustion engine through a plug central axis of the spark plug, the air flow direction is a direction from an intake side of the cylinder head toward an exhaust side along the inner wall surface.

9. The cylinder head structure of the internal combustion engine according to claim 1,
wherein, in the plane perpendicular to the axial direction of the crankshaft of the internal combustion engine through the plug central axis of the spark plug, the first position and the second position are on the same air flow line.

10. The cylinder head structure of the internal combustion engine according to claim 1,
wherein, in the plane perpendicular to the axial direction of the crankshaft of the internal combustion engine through the plug central axis of the spark plug, the first position recedes, along the plug central axis of the spark plug, from the inner wall surface more than the second position.

* * * * *